(12) United States Patent
Wells

(10) Patent No.: US 8,740,258 B2
(45) Date of Patent: Jun. 3, 2014

(54) TWO-AXIS ADJUSTABLE MUD PIPE JOINT

(75) Inventor: David Wells, Cleveland, TX (US)

(73) Assignee: Fabrication of Rig and Exploration Equipment, Inc., Cleveland, TX (US)

( * ) Notice: Subject to any disclaimer, the term of this patent is extended or adjusted under 35 U.S.C. 154(b) by 125 days.

(21) Appl. No.: 13/215,824

(22) Filed: Aug. 23, 2011

(65) Prior Publication Data

US 2013/0052040 A1    Feb. 28, 2013

(51) Int. Cl.
*F16L 27/04* (2006.01)

(52) U.S. Cl.
USPC .............................................. 285/261

(58) Field of Classification Search
USPC ................................. 285/261, 266
See application file for complete search history.

(56) References Cited

U.S. PATENT DOCUMENTS

| | | | | |
|---|---|---|---|---|
| 885,256 | A * | 4/1908 | Jones | 285/261 |
| 910,687 | A * | 1/1909 | Jenkins | 285/261 |
| 1,223,645 | A * | 4/1917 | Van Epps | 285/266 |
| 1,437,372 | A * | 11/1922 | Walters | 285/261 |
| 1,568,649 | A * | 1/1926 | Woodruff | 285/266 |
| 2,421,691 | A * | 6/1947 | Gibson, Jr. et al. | 285/266 |
| 2,456,744 | A * | 12/1948 | Sjoberg | 285/261 |
| 2,474,072 | A * | 6/1949 | Stoner | 285/261 |
| 2,477,762 | A * | 8/1949 | Monroe | 285/266 |
| 2,631,048 | A * | 3/1953 | Palmer | 285/266 |
| 2,774,618 | A * | 12/1956 | Alderson | 285/261 |
| 2,836,436 | A * | 5/1958 | Bianchi | 285/261 |
| 3,141,231 | A * | 7/1964 | Davies et al. | 285/261 |
| 3,429,588 | A * | 2/1969 | Nelson | 285/261 |
| 3,443,828 | A * | 5/1969 | Hale | 285/266 |
| 3,995,889 | A * | 12/1976 | Carr et al. | 285/261 |
| 4,486,037 | A * | 12/1984 | Shotbolt | 285/261 |
| 5,149,147 | A * | 9/1992 | Kastrup et al. | 285/261 |
| 5,362,229 | A * | 11/1994 | Yamaga | 285/261 |
| 6,056,329 | A * | 5/2000 | Kitani et al. | 285/261 |
| 6,237,965 | B1 * | 5/2001 | Kuo | 285/261 |
| 6,269,495 | B1 * | 8/2001 | Sondrup | 285/261 |
| 7,740,287 | B2 * | 6/2010 | Eide | 285/261 |

* cited by examiner

*Primary Examiner* — David E Bochna
(74) *Attorney, Agent, or Firm* — Robert C. Rolnik

(57) ABSTRACT

A pipe having a cylindrical inner wall, a rig end, the rig end having an inner wall having an inside diameter and a remote end. The remote end further comprises a first hemispheric extension that extends from the remote end to at least an outer diameter. A second hemispheric extension connects a surface at an outer cylindrical surface to a pipe exterior wall, wherein the first hemispheric extension and second hemispheric extension form a partial sphere through which, a cavity defined by the inner wall extends.

6 Claims, 8 Drawing Sheets

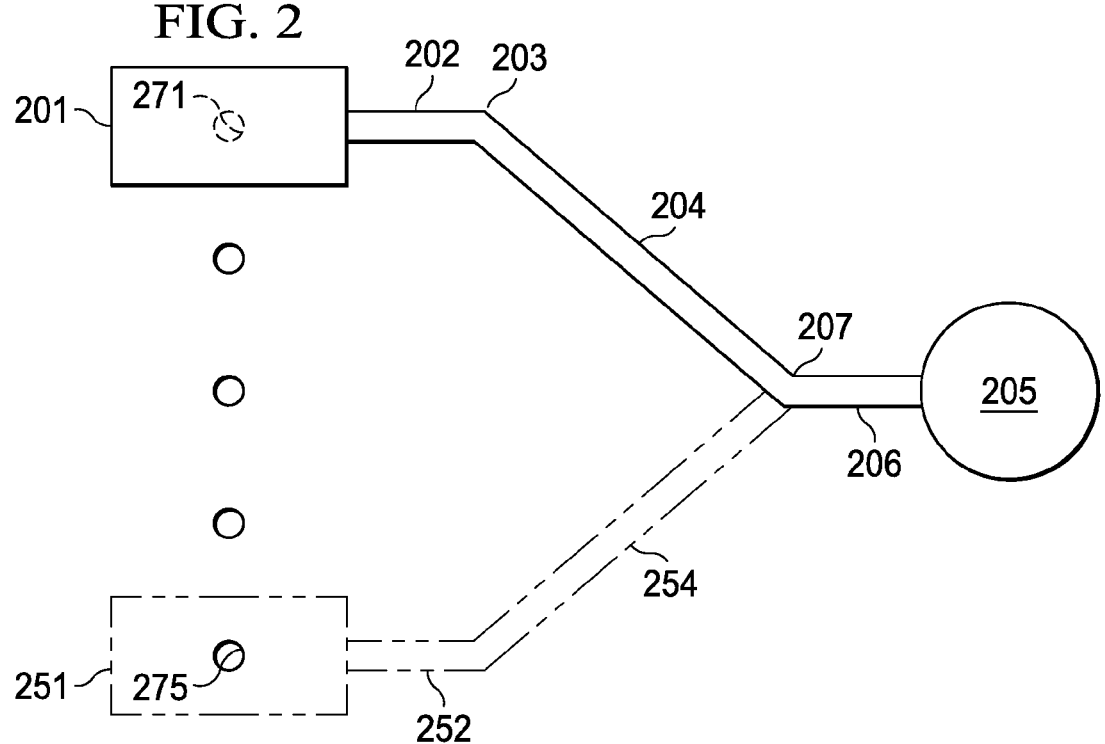

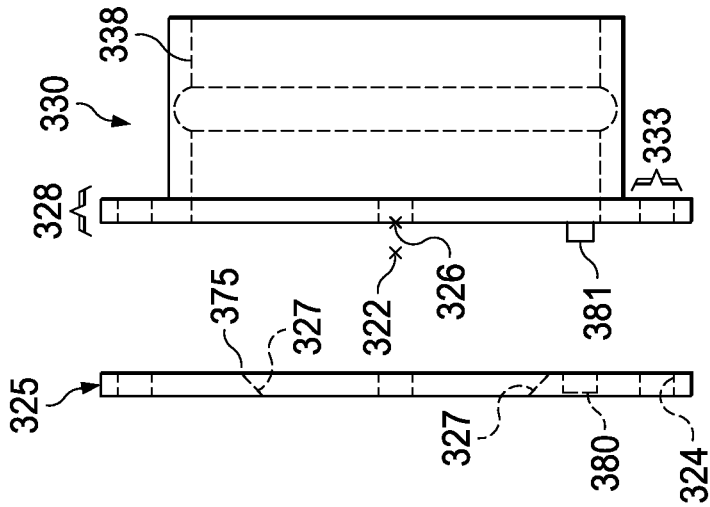
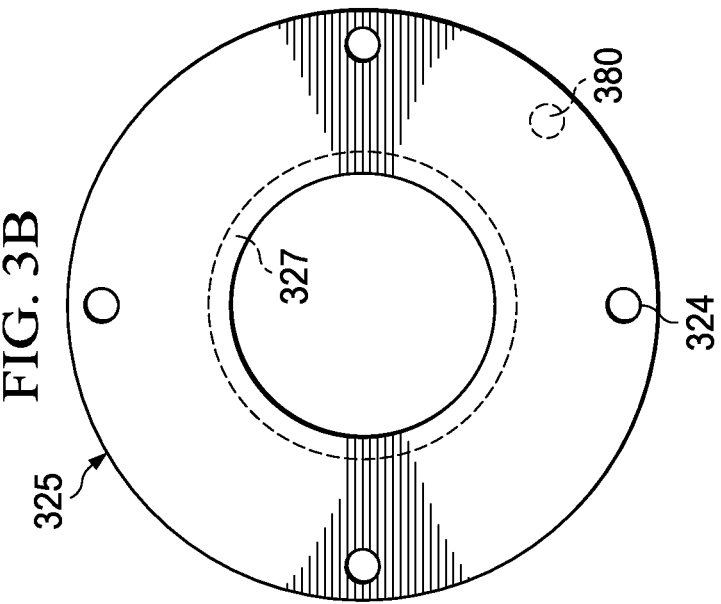

TWO-AXIS ADJUSTABLE MUD PIPE JOINT

BACKGROUND

The present invention relates to an apparatus and method for removing mud and effluents from a drilling operation and more specifically to providing wide-bore adjustable pipes for the carriage of mud from a mobile drilling rig.

Modern slant-well drilling techniques allow for efficient boring to hydrocarbon reservoirs from a relatively centralized location on the surface. This approach permits a single drill site to operate multiple boreholes thereby re-using much of the equipment and other resources that otherwise would be committed to a single borehole. This technique of drilling boreholes from a central location is possible through the use of slant and directional drilling. Accordingly, the central base of operations contrasts to the drilling methods employed decades ago to drill once per section of land straight down from the rig.

FIG. 1A is a top view of rig, mud-pipe and mud tank configuration according to the prior art. Drilling rig 101 may initially be positioned above borehole 121 during drilling and other operations that service the borehole. The drilling rig or, for brevity, 'rig', is the rotary table, top drive and any equipment that supports these devices so that a drill string may be lowered into a borehole. Drilling boreholes requires the use of effluents, commonly referred to as drilling mud or mud. The drilling mud removes broken rock and other materials that are carved away by the drill bit in order to permit further boring into the formation. The mud and other earthen material are carried up the bore hole and directed to mud pipe 107, which carries, usually by operation of gravity, the mix to a shaker manifold 103 which may further directs the mud shale shakers (not shown) and eventually to mud tank 105.

Mud tank 105 is usually affixed to the ground. Even when not attached to the ground, mud tanks are weighted down even when only fractionally filled with mud. Accordingly, mud tanks are not moved without a great deal of effort.

One way the industry has contended with the relative inflexibility of a mud tank is to employ a manifold with nipples, for example, nipples 131-135. The nipples provide a stationary point of attachment for mud pipe 107. When additional boreholes are needed, such as, for example, boreholes 122-125, only rig 101 need be moved to provide access to the additional boreholes. Accordingly, shaker manifold 103 is placed parallel to a line containing the existing or proposed boreholes, such as, for example, boreholes 122-125. The nipples are arranged to correspond to a point directly across from each additional borehole. Thus, when the rig 101 is located over, for example, borehole 122, mud pipe 107 can be installed at the rig's new location to carry the mud a distance to the shaker manifold 103 that is identical to the distance the mud traveled at the mud pipe's 107 former location. Accordingly, mud takes a relatively direct route from borehole 122 to nipple 132.

FIG. 1B is a top view of a rig 101, mud-pipe 107 and mud tank 105 configuration according to the prior art in position two. As can be seen, FIG. 1B shows the rig 101, in simplified form, present over borehole 122 having mud pipe 107 connecting the borehole to nipple 132.

Oilfield operators typically perform the following process to complete a borehole and prepare to drill a subsequent borehole. First, a crew detaches mud pipe 107 at one end, and then detaches the mud pipe at the other second end. Second, the crew moves the mud pipe to a safe location. Third, the crew moves the rig's to a new location. Fourth, the crew moves the mud pipe into position at a new nipple. Fifth, the crew reattaches the mud pipe at the new location so mud can flow from rig to the mud tank. These steps can add a few hours to the downtime that a rig is not actually boring a borehole, sometimes causing members of the drilling crew to be idle during that time. Moreover, this process can be repeated many times over—once for each additional borehole desired at a site.

Accordingly, a faster process is desired.

SUMMARY

According to one embodiment of the present invention a pipe has: a cylindrical inner wall; a rig end, the rig end having an inner wall having an inside diameter and a remote end; the remote end further comprises a first hemispheric extension that extends from the remote end to at least an outer diameter; a second hemispheric extension that connects to an outer cylindrical surface, wherein the first hemispheric extension and second hemispheric extension form a partial sphere through which a cavity defined by the inner wall extends. A partial sphere is a sphere having at least two holes.

A further embodiment discloses a pipe having a cylindrical inner wall. The pipe has a mud tank end having an inside diameter and a remote end. The remote end further comprises a concentric reducer or funnel extending from a socket wall, an inner annular shoulder extending inward from the socket wall and an outer annular shoulder extending inward from the socket wall. The inner annular shoulder and the outer annular shoulder are configured to capture a sphere having a diameter smaller than the diameter of the socket wall.

A further embodiment discloses a pipe. The pipe comprises a mud tank end having an inner wall and a socket connected to the mud tank end by at least the inner wall. The socket further comprises a concentric reducer or funnel having a socket wall extending from the inner wall, an inner annular shoulder extending inward from the socket wall. The socket further comprises an outer annular shoulder attachment facility extending from the inner annular shoulder.

A further embodiment discloses a method of moving a rig attached to at least one pipe. A crewmember may deflate a first o-ring of the at least one pipe. Next, a second o-ring of the at least one pipe may be deflated. Next, the rig may be moved so as to move the at least one pipe, wherein the at least one pipe remains engaged with the rig. Next, the first o-ring may be deflated. Next, the second o-ring may be deflated.

BRIEF DESCRIPTION OF THE SEVERAL VIEWS OF THE DRAWINGS

FIG. 2 is a top view of a rig, mud-pipe and mud tank configuration in accordance with an embodiment of the invention;

FIG. 3B is a side view of the capture ring, looking from the rig towards the mud tank in accordance with an illustrative embodiment of the invention;

FIG. 3C is a second side view of the capture ring and socket in accordance with an illustrative embodiment of the invention;

DETAILED DESCRIPTION

Figure 1A:
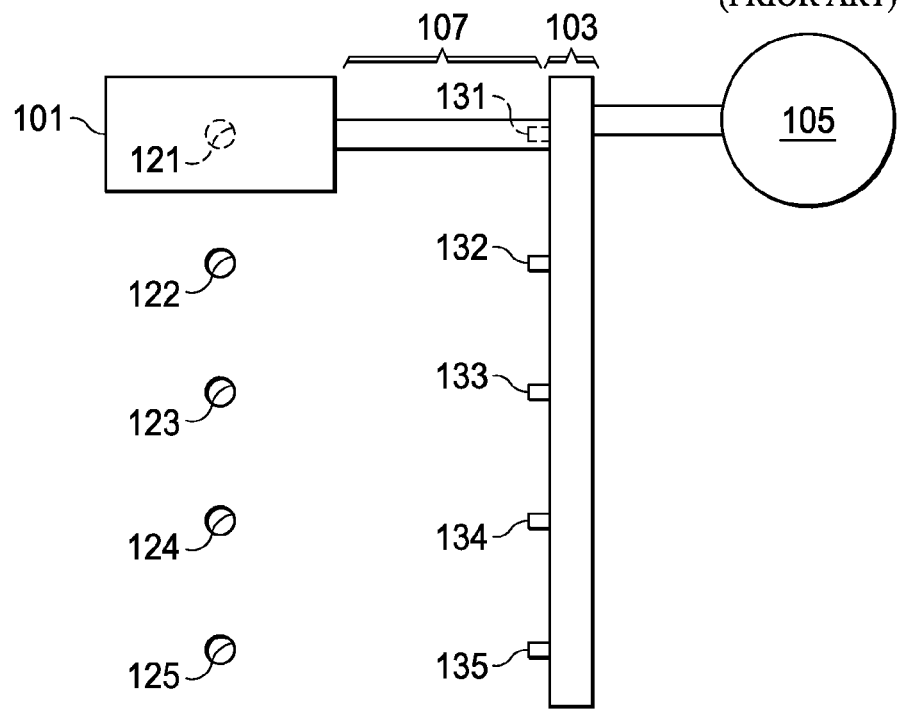
FIG. 1A is a top view of rig, mud-pipe and mud tank configuration according to the prior art in position one.
Figure 1B:
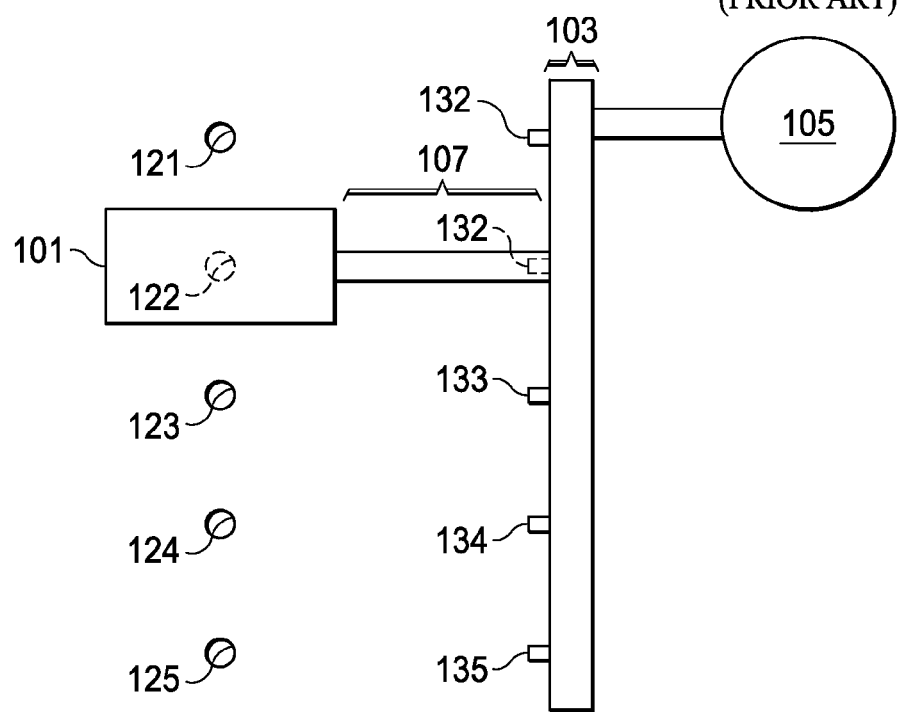
FIG. 1B is a top view of a rig, mud-pipe and mud tank configuration according to the prior art in position two.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

FIG. 2 is a top view of a rig, mud-pipe and mud tank configuration in accordance with an embodiment of the invention. The view shows an initial position for rig 201 over initial borehole 271. A later or final position 251 is shown in dashed lines with rig over final borehole 275. The embodiments include adjustable pipe 204 that can swivel in relation to output pipe 202 and input pipe 206. The pipes swivel about joints located at output-adjustable joint 203 and input-adjustable joint 207. Input pipe 206 carries mud to the mud tank 205.

At the final position, adjustable pipe is placed in position 254 where it is engaged to carry mud from output pipe position 252. Note that mud tank 205 and input pipe 206 are unchanged in their location, and yet the integrity of the mud flow can be maintained through the use of joints 203 and 207.

The illustrative embodiments permit an oilfield operator to move a drilling rig to multiple boreholes without the need to move a corresponding mud tank. A pipe provides a mud-resistant fitting that can be rotated about two-degrees of freedom. As such, pressure adjustments at one or more such fittings or joints permit the pipe to be rotated at plural joints. Further, a telescoping feature permits the pipe to extend or retract while maintaining a conduit that is open to the mud tank. Accordingly, little or no work is needed to prepare the pipe for a second rig location at a site where multiple boreholes are operated upon.

Figure 3A:
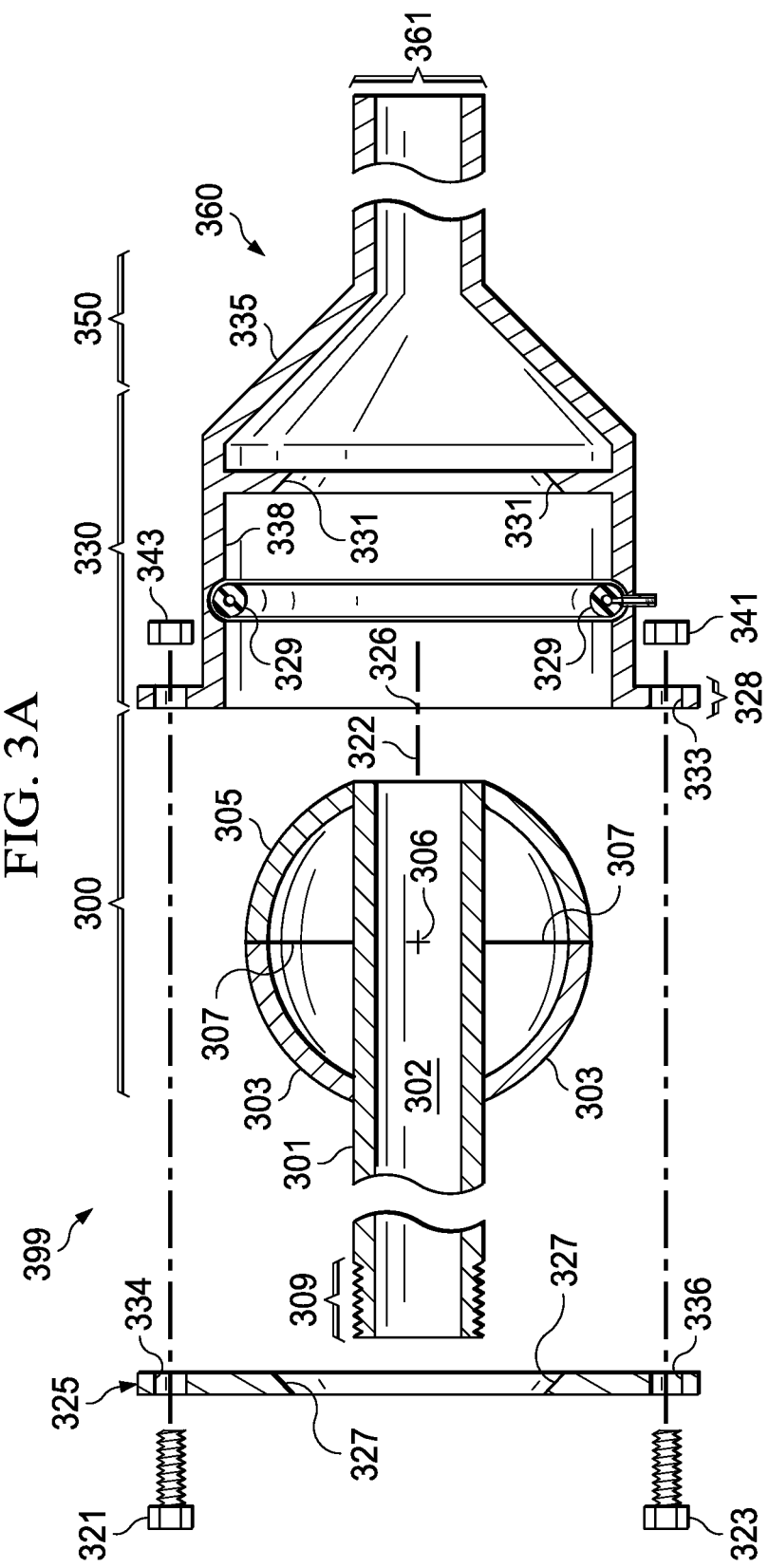
FIG. 3A is a top exploded view of a two-degree of freedom mud-pipe joint in accordance with an embodiment of the invention.

FIG. 3A is a top exploded view of a two-degree of freedom mud-pipe joint in accordance with an embodiment of the invention. A first pipe has a rig end 309 or inlet which may be used to connect to a drain or other collector of the rig that collects mud circulated from the borehole. The rig end may include an attachment facility that permits attaching to a source of effluents from a drilling rig. For example, the attachment facility can be helical threads Alternatively, an attachment facility can be a flange on the rig end, through which bolts may be extended to bolt the remote end to a suitable bulkhead of the rig.

The pipe includes an outer cylindrical surface 301 and an inner wall 302, which may be cylindrical. The remote end may be arranged to permit rotational sliding in another pipe having a suitable geometry. Accordingly, the outer cylindrical surface 301 may have an attached hemispheric extension that connects the outer cylindrical surface to a second hemispheric extension 305. Pipe 399 can be made from two hemispheres, for example, formed of steel. A hemisphere can have a hole cut into the top portion of the dome to leave an aperture wide enough for a conventional 10-12 inch pipe to be placed therein. A hemispheric extension is a hemisphere with a hole formed with a center on a longitudinal axis with the edge of the hemisphere. In other words, a hemisphere, when placed on a flat surface, can have a top section removed along a horizontal line. The remaining material is a hemispheric extension. The outermost circumference of each hemispheric extension may be welded together along weld seam 307 to provide a generally spherical end or remote end 300. A weld seam can be a continuous weld that begins at an outer edge of a hemispheric extension and is finished at the same point where it began. Thus, the opening of one end of the conventional pipe may be at the hole in second hemispheric extension 305. Hemispheric extensions 303 and 305 may form a partial sphere through which a cavity admits mud to flow out the pipe. The hemispheric extensions are placed so that pivot point 306 operates as a center to a sphere to which the hemispheric extensions match. This pivot point is located the axis or axes about which first pipe 399 rotates.

Spherical end or remote end 300 is among a class of pipe joints called ball joints. Ball joints, when pressure of a surrounding elastomeric o-ring is released, can be made to slide within the sockets in which they are typically placed.

It is appreciated that the spherical geometry of remote end 300 may be constructed in alternative ways, for example, by welding a pre-formed sphere having two opposing holes to a conventional pipe. In any configuration, remote end 300 has an outer diameter which is uniformly substantially the same for multiple cross-sections through rotational axis 306. As such, rotational axis 306 can be a pivot point about which the pipe may pitch or yaw in two-degrees of freedom.

A second pipe 360 can provide a cavity in which remote end 300 may be placed. Second pipe 360 can have a mud tank end 361, cylindrical body 350 and socket 330. Socket 330 may have flange 328 through which plural bolt holes can be used to fasten an additional ring. Without the ring, socket 330 has an enlarged cavity large enough to admit remote end 300 of first pipe 399.

Socket 330 has circumferential groove in which an o-ring may be placed. An o-ring, also referred to as a union, can be, for example, elastomeric o-ring 329, such as, for example, a seal-o-grip ring. One embodiment may permit filling o-ring 329 with air or other fluids to adjust the tolerances and pressures that the o-ring may exert on remote end 300.

Two parts of socket 330 can provide capture of remote end 300. First, annular shoulder 331 can provide a stop to prevent further ingress of remote end 300. Annular shoulder 331 can be angled to substantially match a spherical surface of the remote end. Annular shoulder 331 can extend from a socket wall 338 of socket 330, for example, as presented by hemispheric extension 305. Annular shoulder 331 has an annular shoulder center that lies on a longitudinal center to socket 330. The socket wall is larger than the circumference of remote end 300. Circumferential groove 339 is disposed in the socket wall. Circumferential groove 339 engages an o-ring that has or can be made to have a circumference larger than the socket wall. O-ring 329 operates as a second surface that distributes loading of the remote end to the circumferential groove such that the remote end may rest substantially engaged to o-ring 329 when fully inserted into socket 330. Funnel portion 335 (also known as concentric reducer or 'funnel') may reduce the diameter of socket 330 to a narrower diameter. For example, the socket wall can have an 18 inch diameter, while the throat of the funnel may have a 12 inch diameter.

Socket wall 338 has a diameter called a socket wall diameter. The socket wall has a diameter to capture a sphere having a diameter smaller than the diameter of the socket wall diameter. In other words, the socket wall is at least as large as weld seam 307 of FIG. 3A.

Addition of a capture ring 325 to flange 328 can prevent withdrawal of remote end 300 from socket 330. Capture ring 325 has holes 334, 336 that admit bolts 321, 323 through the flange to further attach to nuts 341, 343. The flange admits bolts, for example, through hole 333. In the captured configuration, shown more directly in FIG. 4, annular shoulder 327 can be in rotational engagement with hemispheric extension 303 and/or hemispheric extension 305 to prevent escape of remote end 300 from socket 330. In this captured configuration, the spherical remote end may remain in substantial engagement between two annular shoulders.

FIG. 3B is a side view of the capture ring, for example, looking from the rig towards the mud tank in accordance with an illustrative embodiment of the invention. Capture ring 325 may be bolted to a flange through bolt holes, for example, bolt hole 324. Key hole 380 may be an indentation in a face of the ring. Accordingly, the capture ring can be bolted to the flange in the correct orientation. Outer annular shoulder 327 provides a surface for engagement to a spherical pipe end when capture ring 325 encircles a remote end, such as, for example, remote end 300 of FIG. 3A. Although FIG. 3B depicts a capture ring having four holes that may align to four holes in flange 328 of FIG. 3C, it is appreciated that more bolts and corresponding holes may assure a better seal. Accordingly, at least one embodiment uses twelve bolt holes in capture ring 325 and a corresponding twelve bolt holes in the flange.

FIG. 3C is a second side view of the capture ring and socket in accordance with an illustrative embodiment of the invention. Outer annular shoulder 327 is oriented in a correct manner to trap a spherical member having a center located generally to the right of the ring. Accordingly, unless key hole 380 is out of alignment with key 381, capture ring 325 may not rest in a flat configuration against flange 328. However, in a correct orientation, the capture ring will engage key hole 380 with key 381 and provide a correct registration of bolt hole 324 of FIG. 3B to bolt hole 333. To place the capture ring in an orientation that matches the socket and/or spherical member, outer annular shoulder 327 has broad side 375 facing the cavity of socket 330.

It is appreciated that flange 328 may be among devices known as outer annular shoulder attachment facility. An outer annular shoulder attachment facility is any device that permits attachment of a ring that captures a remote end of a pipe having a generally spherical end, while allowing rotation about a point within the socket. The outer annular shoulder attachment facility provides for multiple attachment points, which in the cases shown in FIGS. 3A-3B, are bolt holes. It is appreciated that clamps, latches, screw threads and the like can operate to attach a capture ring to socket 330. Moreover, when attached, the capture ring has a first inner annular shoulder center 326 and a second outer annular shoulder center 322 that are positioned along a longitudinal center of socket 330.

Figure 4:
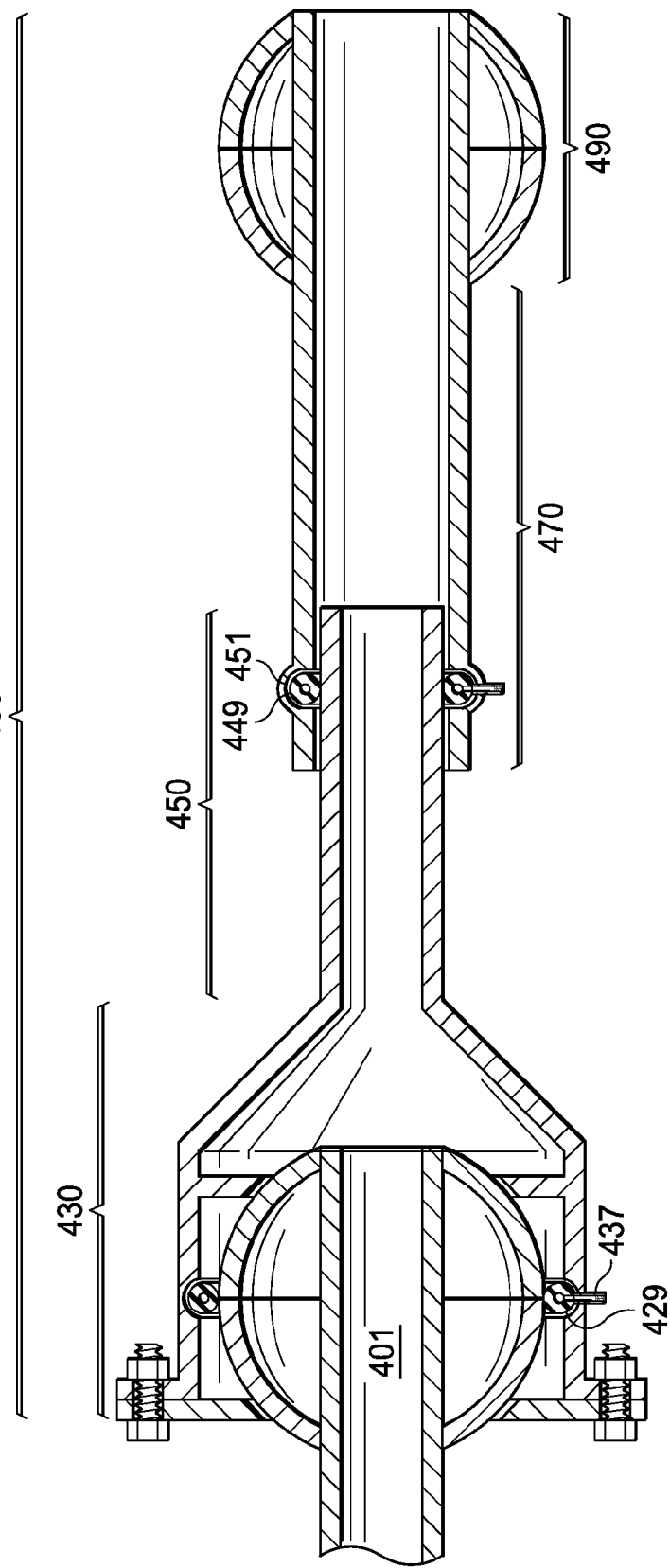
FIG. 4 is a top view of an extendable middle pipe in accordance with one embodiment of the invention.

FIG. 4 is a top view of an extendable middle pipe in accordance with one embodiment of the invention. FIG. 4 shows a pipe that can contain gravity-fed fluids and may extend and rotate at each end when coupled to a reciprocal part, such as remote end 401 or socket 330 of FIG. 3A. Pipe 400 may correspond to pipe 204 or 254 of FIG. 2. Accordingly, pipe 400 can form a middle link between a pipe 202 having a remote end and another pipe 206 of FIG. 2 having a socket. Extendable middle pipe 400 can be used, for example, as middle pipe 204 of FIG. 2.

Pipe 400 can comprise four general parts, namely socket 430, inner telescoping portion 450, outer telescoping portion 470, and remote end 490. Inner telescoping portion 450 can have an inside diameter of 10 inches. The length of pipe 400 can be adjusted, without necessarily resorting to use of tools, by pulling or pushing socket 430 and inner telescoping portion 450 longitudinally along an axis that runs through outer telescoping portion 470. In such a configuration, pipe 400 can be extended to a length that is approximately 180% of a fully collapsed length. Outer telescoping portion 470 can have an inside diameter of 12 inches. The inner telescoping portion has a corresponding outside diameter smaller than the inside diameter of outer telescoping portion. It is appreciated that inside diameters may generally be larger than eight inches in order to flow a sufficient amount of mud.

Outer telescoping portion 470 contains o-ring 429 disposed in circumferential groove 451. O-ring 429, when deflated through valve 437, can permit insertion and removal of inner telescoping portion 450 within outer telescoping portion 470. When inflated, o-ring 449 may create a seal about inner telescoping portion 470 so that the gravity fed mud flowing therein does not escape pipe 400.

It is appreciated that pipe 400 is not drawn to scale. Accordingly the proportions of longitudinal length to transverse width can be greater or smaller than pictured. Some embodiments may be 25 feet from the flange on the left to joint 490 on the right. It is appreciated that pipe 400 can be used as the sole adjustable link between a rig and a mud tank. However, if additional boreholes are desired that are outside the tolerances of a fully extended pipe, additional pipes having a similar geometry to pipe 400 can be introduced to form additional links as needed.

Figure 5:
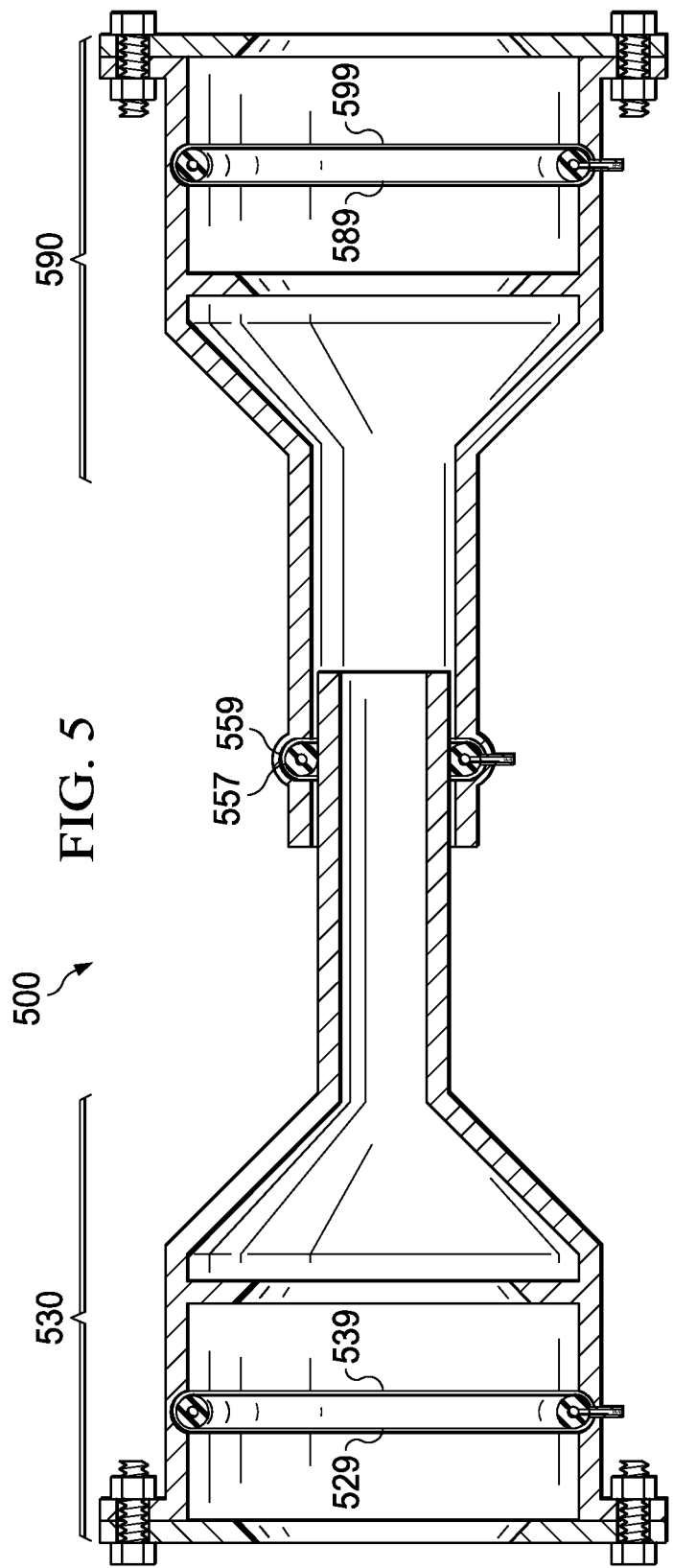
FIG. 5 shows an alternate configuration pipe in accordance with an illustrative embodiment of the invention.

FIG. 5 shows an alternate configuration pipe in accordance with an illustrative embodiment of the invention. Alternate configuration pipe 500 uses socket 530 with a corresponding capture ring to provide an interface to receive a joint, such as, for example, 300 shown in FIG. 3A. Circumferential groove 539 houses elastomeric o-ring 529. In addition, in the alternative embodiment may replace joint 490 of FIG. 4 with a socket 590. A flange is incidentally shown with socket 590. Accordingly, socket 590 may engage with a spherical joint (not shown) that is relatively fixed in location and rigidly attached to a shaker manifold. In this alternative embodiment, three elastomeric o-rings (also known as air-seals) are present in the resultant pipe. A first elastomeric o-ring is elastomeric o-ring 529 located within circumferential groove 539. A second elastomeric o-ring is elastomeric o-ring 557 located within circumferential groove 559. A third elastomeric o-ring is elastomeric o-ring 589 which is in circumferential groove 599. Socket 530 and socket 590 are shown with capture rings attached, which can be helpful when transporting pipe 500 to a work-site. It is appreciated that capture rings are removed to admit spherical joints from corresponding parts to be inserted into their respective sockets.

Figure 6:
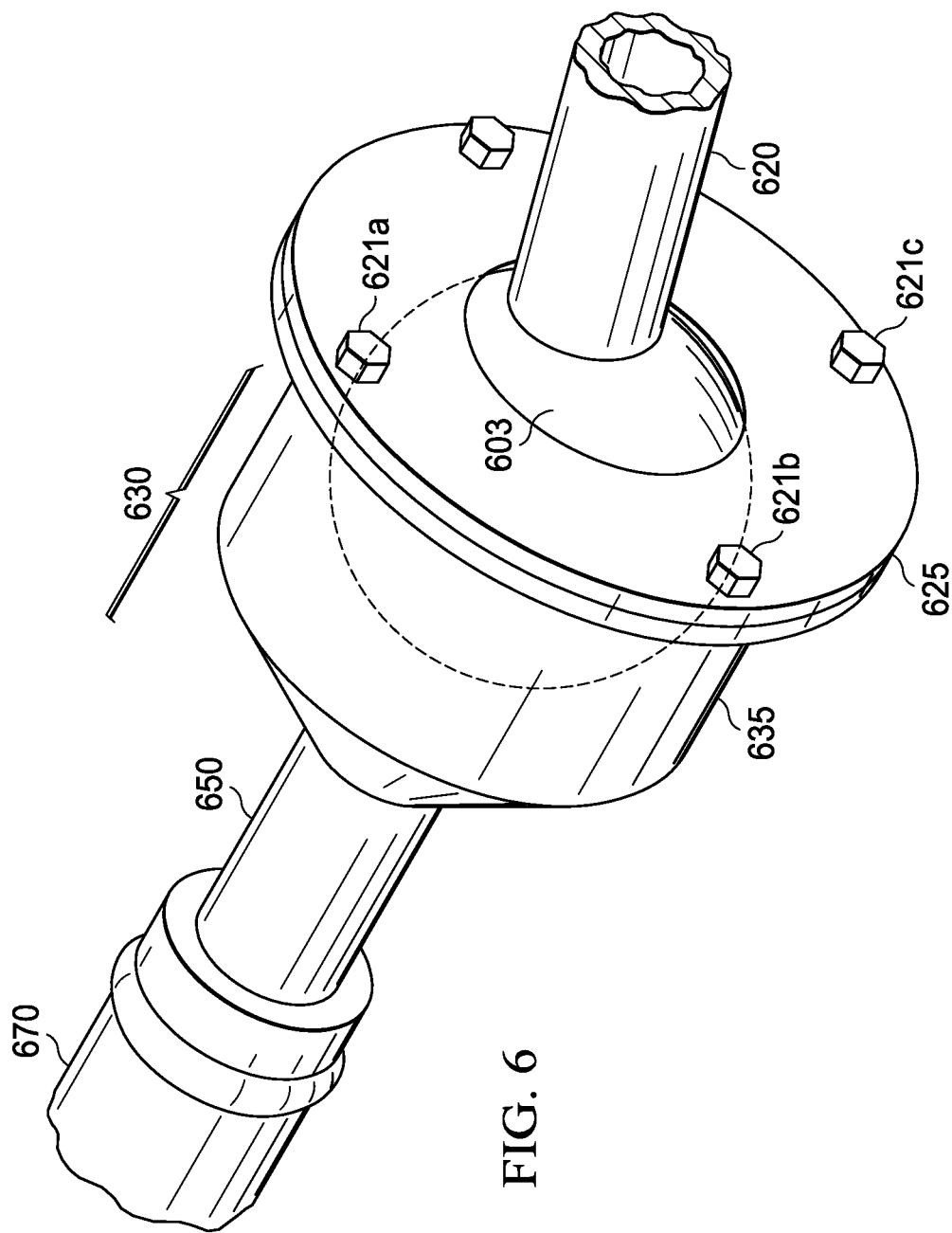
FIG. 6 is an isometric view of a rig pipe and an extendable middle pipe in accordance with one embodiment of the invention.

FIG. 6 is an isometric view of a rig pipe and an extendable middle pipe in accordance with one embodiment of the invention. Extendable middle pipe can be, for example, pipe 400 of FIG. 4. Pipe 620 may initially carry mud to hemispheric extension 603, funnel portion 635, inner telescoping portion 650 and outer telescoping portion 670. Capture ring 625 is shown with bolt heads 621a, 621b, and 621c, which are used to attach capture ring 625 to a flange of socket 630.

A pipe having two degrees of freedom as shown in FIG. 4 can be used in several ways. First, socket 430 can pitch and yaw to accommodate a moving rig. Second, remote end 490 can pitch and yaw to accommodate the moving rig. Third, the varying distance of the rig to the mud tank can be accommodated by adjusting a length through the sliding movement of telescoping inner portion and telescoping outer portion. As such, for many rig movements, the only time, short of servicing the pipe, that tools may be required, can be at the time that the capture ring is bolted to a flange. This bolting step may be performed once per site—in preparation of operating on the first borehole.

Figure 7:
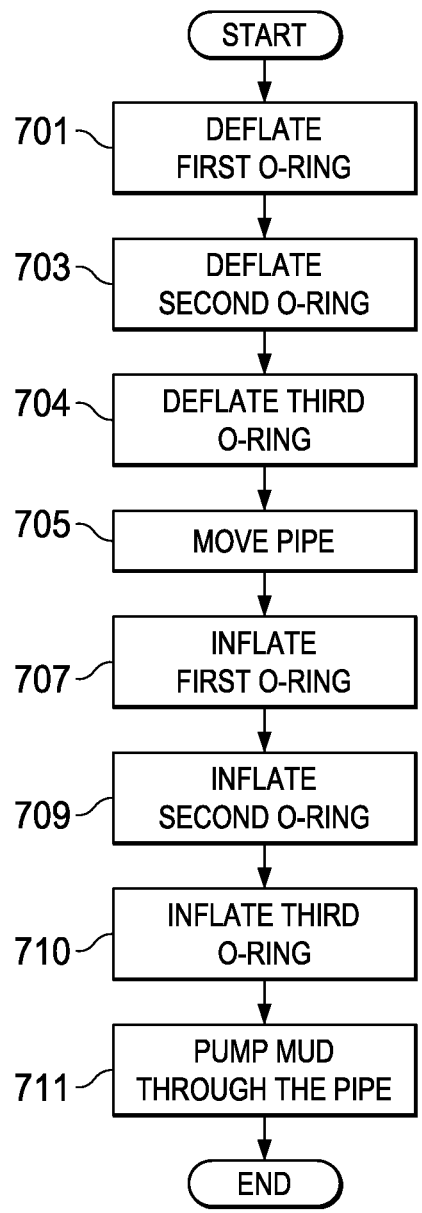
FIG. 7 is a process for moving a pipe while one end is in rotational engagement near the mud tank in accordance with an illustrative embodiment of the invention.

FIG. 7 is a process for moving a pipe while one end is in rotational engagement near the mud tank in accordance with an illustrative embodiment of the invention. Initially, a first o-ring is deflated (step 701). Next, a second o-ring is deflated (step 703). The first o-ring and second o-ring may be elastomeric o-ring 429 and elastomeric o-ring 449, respectively, of FIG. 4. Next, a third o-ring can be deflated (step 704). The third o-ring can be, for example, elastomeric o-ring 589 of FIG. 5. Next, the pipe is moved (step 705). The pipe can be, for example, middle pipe 204 of FIG. 2. Step 705 can be performed by moving a rig in relation to a mud tank, as can occur in the case of moving from borehole 271 to borehole 275 (see FIG. 2). Thus, the rig may be moved, even on rolling terrain, along a line that may first reduce the length of pipe 400, and then, extend the length of pipe 400 until the next borehole 275 is reached. Moreover, the pipe, at least indirectly, remains engaged with the rig.

The rig may reach a position where the workers are prepared to work the next borehole. At this new location, the rig may be anchored to the ground or otherwise left in a sufficiently stable position to begin operations. Accordingly, the first o-ring may be inflated (step 707). Next, the second o-ring may be inflated (step 709). Next, a third o-ring may be inflated (step 710). The pipe may be ready for holding a mud flow. Next, the operator of the pipe may pump mud through the pipe (step 711). As can be appreciated, in configurations where additional linking pipes are part of the mud flow, any additional o-rings may be deflated following step 704. Similarly, any o-rings that remain un-inflated, can be inflated after step 710.

It is appreciated, that pipe 400 can be used as the sole adjustable link between a rig and a mud tank. However, if additional boreholes are desired that are outside the tolerances of a fully extended pipe, additional pipes having a similar geometry to pipe 400 can be introduced to form additional links as needed.

In addition, the pipe as disclosed, may have sufficient integrity, even after releasing air from the elastomeric o-rings, that mud may not need to be evacuated from the pipe prior to moving the rig.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A pipe comprising:
    a rig end, the rig end having an inner wall having an inside diameter;
    a remote end connected to the rig end by the inside diameter, the remote end further comprising:
    a first hemispheric extension that extends from the remote end to at least an outer diameter; and
    a second hemispheric extension that connects to an outer cylindrical surface, wherein the first hemispheric extension and second hemispheric extension form a partial sphere through which a cavity defined by the inner wall extends, and wherein the first hemispheric extension and second hemispheric extension are joined by a weld seam.

2. The pipe of claim 1, the inside diameter is at least eight inches.

3. The pipe of claim 1, wherein the rig end has helical threads.

4. The pipe of claim 1, wherein the outer diameter is at least twice the inside diameter.

5. A pipe, the pipe comprising:
    a mud tank end having an inner wall;
    a socket connected to the mud tank end by at least the inner wall, the socket further comprising:
    a funnel having a socket wall extending from the inner wall, an inner annular shoulder extending inward from the socket wall; and
    an outer annular flange extending from the socket, wherein the capture ring has at least three bolt holes, and a corresponding recessed key for receiving a protruding key, the outer annular flange having a broad side on a side facing the same direction as the recessed key, wherein the protruding key protrudes in an axial direction from the outer annular flange.

6. The pipe of claim 5, wherein the outer annular flange has at least three connection points for attaching the capture ring.

* * * * *